US012717626B2

(12) United States Patent
Kim et al.

(10) Patent No.: US 12,717,626 B2
(45) Date of Patent: Aug. 25, 2026

(54) ELECTRONIC DEVICE AND ACCESS EVENT AUDIO-VISUALIZATION METHOD

(71) Applicant: Samsung Electronics Co., Ltd., Suwon-si (KR)

(72) Inventors: Kiyong Kim, Suwon-si (KR); Wanho Roh, Suwon-si (KR); Seul Bang, Suwon-si (KR); Bumhan Kim, Suwon-si (KR); Gailjoon Ahn, Suwon-si (KR); Yeonggeun Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 413 days.

(21) Appl. No.: 18/296,670

(22) Filed: Apr. 6, 2023

(65) Prior Publication Data

US 2023/0244531 A1 Aug. 3, 2023

Related U.S. Application Data

(63) Continuation of application No. PCT/KR2021/014736, filed on Oct. 20, 2021.

(30) Foreign Application Priority Data

Nov. 20, 2020 (KR) ........................ 10-2020-0157125

(51) Int. Cl.
*G06F 9/50* (2006.01)

(52) U.S. Cl.
CPC .................................. *G06F 9/5016* (2013.01)

(58) Field of Classification Search
CPC ..................................................... G06F 9/5019
See application file for complete search history.

(56) References Cited

U.S. PATENT DOCUMENTS 10,152,364 B2 12/2018 Young et al.
2010/0138832 A1 6/2010 Kim et al.
(Continued)

FOREIGN PATENT DOCUMENTS

JP 5703968 B2 4/2015
JP 5925803 B2 5/2016
(Continued)

OTHER PUBLICATIONS

Keeping Context In Mind: Automating Mobile App Access Control with User Interface Inspection (Year: 2019).*
(Continued)

*Primary Examiner* — Abdullah Al Kawsar
(74) *Attorney, Agent, or Firm* — Jefferson IP Law, LLP

(57) ABSTRACT

An electronic device is provided. The electronic device includes a display, a memory, and a processor operatively connected to the display and the memory, wherein the processor can be configured to detect an access event, occurring through an application, for a resource of the electronic device, acquire an application execution screen image in response to the detection of the access event, map the acquired application execution screen image with event information indicating the access event and store same, and display, on the basis of a user input, a first screen image including the event information and the application execution screen image mapped with the event information on the display.

13 Claims, 15 Drawing Sheets

(56) References Cited

U.S. PATENT DOCUMENTS

| | | | | |
|---|---|---|---|---|
| 2010/0153548 | A1* | 6/2010 | Wang | G06Q 30/02 709/224 |
| 2016/0191534 | A1 | 6/2016 | Mallozzi | |
| 2017/0118611 | A1 | 4/2017 | Schieman et al. | |
| 2019/0065711 | A1 | 2/2019 | Seo et al. | |
| 2019/0130081 | A1 | 5/2019 | Sambamurthy et al. | |

FOREIGN PATENT DOCUMENTS

| | | | | |
|---|---|---|---|---|
| KR | 10-2012-0136126 | A | | 12/2012 |
| KR | 20140054964 | | * | 5/2014 |
| KR | 10-1437122 | B1 | | 9/2014 |
| KR | 10-1444250 | B1 | | 9/2014 |
| KR | 10-2016-0000565 | A | | 1/2016 |
| KR | 10-1590626 | B1 | | 2/2016 |
| KR | 10-1633490 | B1 | | 6/2016 |
| KR | 10-1673364 | B1 | | 11/2016 |
| KR | 10-2017-0104145 | A | | 9/2017 |
| KR | 10-1990848 | B1 | | 9/2019 |
| KR | 10-2405752 | B1 | | 6/2022 |

OTHER PUBLICATIONS

Korean Office Action dated Apr. 7, 2025, issued in a Korean Patent Application No. 10-2020-0157125.

International Search Report dated Jan. 20, 2022, issued in International Patent Application No. PCT/KR2021/014736.

Korean Office Action dated Dec. 26, 2025, issued in a Korean Patent Application No. 10-2020-0157125.

* cited by examiner

ELECTRONIC DEVICE AND ACCESS EVENT AUDIO-VISUALIZATION METHOD

CROSS-REFERENCE TO RELATED APPLICATION(S)

This application is a continuation application, claiming priority under § 365(c), of an International application No. PCT/KR2021/014736, filed on Oct. 20, 2021, which is based on and claims the benefit of a Korean patent application number 10-2020-0157125, filed on Nov. 20, 2020, in the Korean Intellectual Property Office, the disclosure of which is incorporated by reference herein in its entirety.

BACKGROUND

1. Field

The disclosure relates to an electronic device. More particularly, the disclosure relates to an electronic device for, when an event of accessing data by an application occurs, detecting, visualizing, and auralizing occurrence of the event, and a method for audio-visualizing an access event of an electronic device.

2. Description of Related Art

With the development of mobile communication technology and processing technology, mobile terminal devices (hereinafter, electronic devices) may implement, in addition to a conventional calling function, various functions by using various applications.

Some applications of an electronic device may access data stored in the electronic device as needed, and may access data including personal information, such as an address book, location information, and short message service (SMS). An electronic device may record access to personal information data of such an application so that a user can check the same.

The above information is presented as background information only to assist with an understanding of the disclosure. No determination has been made, and no assertion is made, as to whether any of the above might be applicable as prior art with regard to the disclosure.

SUMMARY

Recording of access events provided by conventional electronic devices is simple listing of several records in the order of most recent event. Accordingly, even if a corresponding record is checked, information on a time and a reason for using a corresponding authority and a user's behavior causing occurrence of data access are not provided, so that it is difficult to recognize a related matter.

In addition, a function to configure a criterion for deleting a data access record is not provided, identification of a case that has passed a certain period of time cannot be identified due to the small amount of identifiable data access records, and there is no function to estimate anomalies in data access and inform a user of the same.

Aspects of the disclosure are to address at least the above-mentioned problems and/or disadvantages and to provide at least the advantages described below. Accordingly, an aspect of the disclosure is to provide an electronic device for, when an event of accessing data by an application occurs, detecting, visualizing, and auralizing occurrence of the event, and a method for audio-visualizing an access event of an electronic device Additional aspects will be set forth in part in the description which follows and, in part, will be apparent from the description, or may be learned by practice of the presented embodiments.

In accordance with an aspect of the disclosure, an electronic device is provided. The electronic device includes a display, a memory and a processor operatively connected to the display and the memory. The processor is configured to detect an access event for a resource of the electronic device, which is generated by an application, acquire an execution screen of the application in response to detection of the access event and map the acquired execution screen of the application with event information indicating the access event so as to store the same.

In accordance with another aspect of the disclosure, a method for visualizing an access event by an electronic device is provided. The method includes detecting an access event for a resource of an electronic device, which is generated by an application, acquiring an execution screen of the application in response to detection of the access event and mapping the acquired execution screen of the application with event information indicating the access event so as to store the same.

According to various embodiments of the document, when a user performs an action, it is possible to intuitively grasp use of corresponding authority by detecting, when an access event by an application occurs, the occurrence of the event, immediately notifying of the same, determining whether there is an abnormal behavior, and audio-visually displaying information on an application execution screen and the access event.

Furthermore, measures, such as configuring authority for each application or deleting an application, can be taken in a separate control menu. Through this, a risk of leakage for personal information protection can be aroused, and a protection method can be learned.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
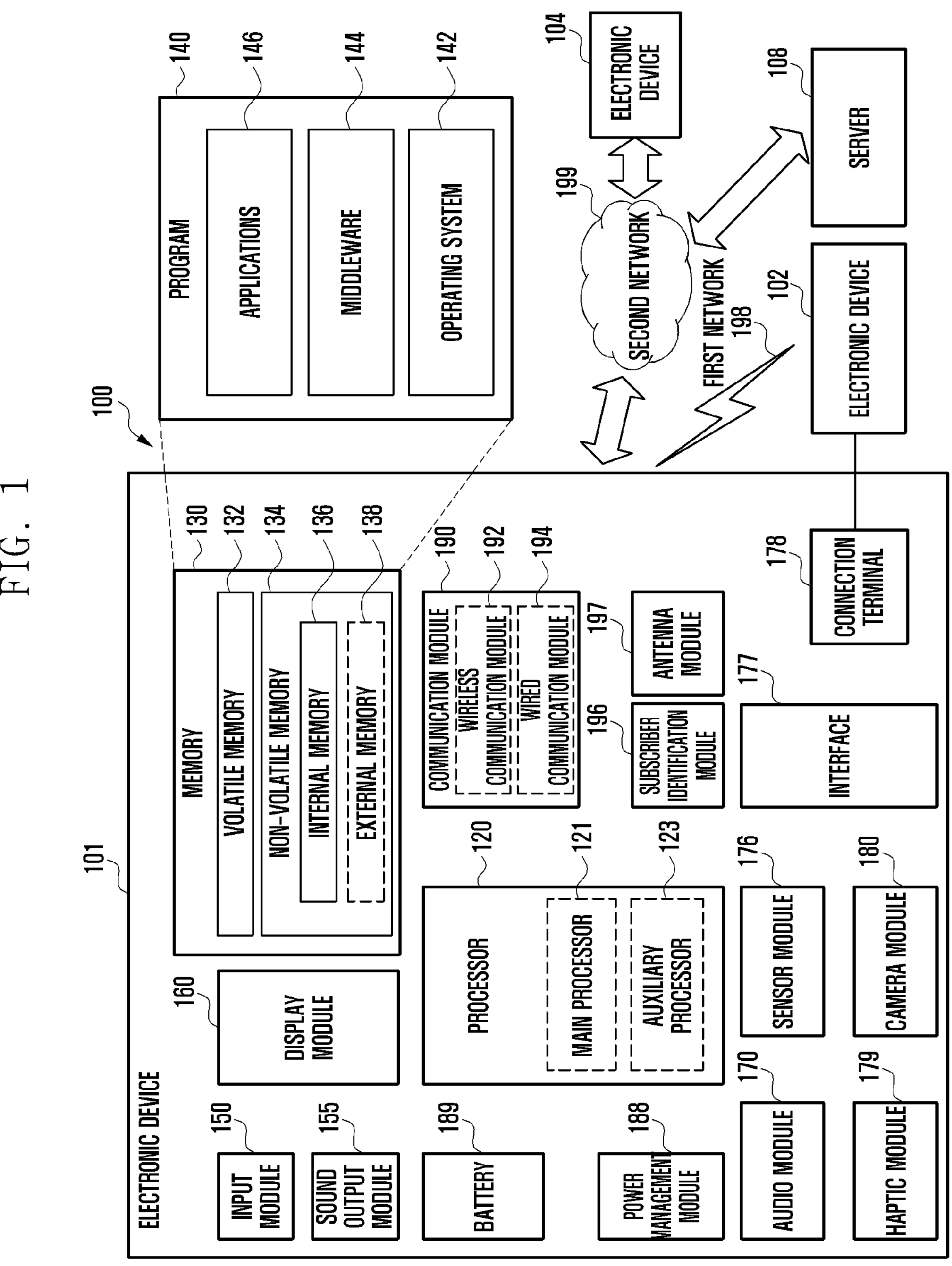
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, or 104, or the 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
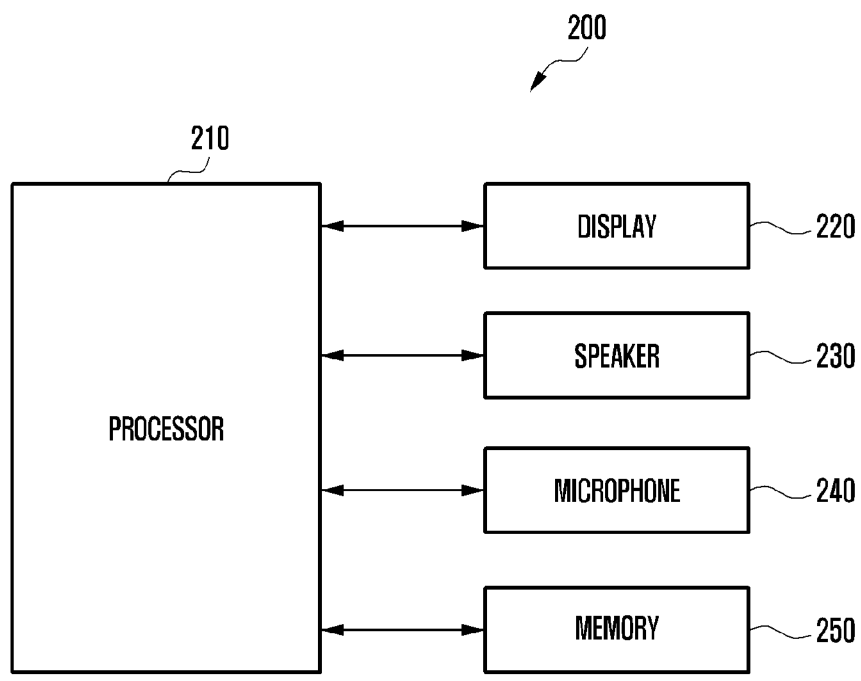
FIG. 2 is a block diagram of an electronic device according to an embodiment of the disclosure.

FIG. 2 is a block diagram of an electronic device according to an embodiment of the disclosure.

Referring to FIG. 2, an electronic device 200 may include a processor 210, a display 220, a speaker 230, a microphone 240, and a memory 250, and some of elements illustrated in various embodiments may be omitted or substituted. The electronic device 200 may further include at least some of the elements and/or functions of the electronic device 101 of FIG. 1. At least some of respective illustrated (or not illustrated) elements of the electronic device 200 may be at least one of operatively, functionally, or electrically connected to each other.

According to various embodiments, the display 220 may display various images under a control of the processor 210. The display 220 may be implemented as one of a liquid crystal display (LCD), a light-emitting diode (LED) display, and an organic light-emitting diode (OLED) display, but is not limited thereto. The display 220 may be configured as a touch screen which senses at least one of a touch or a proximity touch (or hovering) input using a user's body part (e.g., a finger) or an input device (e.g., a stylus pen). The display 220 may include at least some of the elements and/or functions of the display device 160 of FIG. 1.

According to various embodiments, at least a part of the display 220 may be flexible, and may be implemented as a foldable display or a rollable display.

According to various embodiments, the speaker 230 may output various audios provided from the processor 210. The speaker 230 may convert an audio signal, which is a digital signal, into an analog signal and output the converted signal. At least a part of the speaker 230 is exposed to the outside through a part of a housing of the electronic device 200 so as to output audio to the outside.

According to various embodiments, the microphone 240 may receive various voice information received in the electronic device 200. The microphone 240 may convert analog voice information into an audio signal that is a digital signal, and store the converted signal. At least a part of the microphone 240 may be exposed to the outside through a part of the electronic device 200.

According to various embodiments, the memory 250 may include a volatile memory (e.g., the volatile memory 132 of FIG. 1) and a non-volatile memory (e.g., the non-volatile memory 134 of FIG. 1) so as to temporarily or permanently store various data. The memory 250 may include at least some of the elements and/or functions of the memory 130 of FIG. 1 and may store the program 140 of FIG. 1.

According to various embodiments, the memory 250 may store various instructions that may be executed by the processor 210. The instructions may include control commands, such as arithmetic and logical operations, data movement, and inputs/outputs, which may be recognized by the processor 210.

According to various embodiments, the processor 210 is an element capable of performing data processing or calculation related to control and/or communication of each element of the electronic device 200, and may include one or more processors 210. The processor 210 may include at least some of the elements and/or functions of the processor 120 of FIG. 1.

According to various embodiments, calculation and data processing functions which may be implemented by the processor 210 on the electronic device 200 will not be limited. However, hereinafter, various embodiments for identifying an access event for a determined resource by an application, at least one of visualizing and storing the access event, or providing audio-visual information via the display 220 and the speaker 230 will be described. Operations of the processor 210, which will be described later, may be performed by loading instructions stored in the memory 250.

According to various embodiments, the processor 210 may execute an application. Applications executable by the electronic device 200 are not limited, and may include, for example, Internet browser, messenger, map, and navigation applications.

According to various embodiments, the processor 210 may detect an access event to a resource of the electronic device 200, which occurs by an application. Here, the access event may include cases in which an application uses a hardware function included in the electronic device 200 or uses, copies, deletes, moves, or inquires of information related to personal information.

According to various embodiments, a resource may include some of hardware and/or software of the electronic device 200. For example, when an application uses hardware resources, such as a microphone, a camera, Wi-Fi, and a memory read/write of the electronic device 200, or accesses resources related to personal information, such as body data, a body activity, location information, an address book, a camera, a calendar, a call record, and SMS, the processor 210 detects the same. According to an embodiment, the application may provide a user interface enabling identification of whether access to the resources is allowed, when the application is installed, updated, and/or first executed, and even thereafter, whether access to the resources is allowed may be changed according to a user's selection. The processor 210 may allow access to a corresponding resource according to a user's selection.

According to various embodiments, the processor 210 may determine whether a detected access event of an application has an abnormal behavior. Here, the abnormal behavior may include, from among detected data access events, at least one of a case in which an application in a background state accesses data a determined number of times or more, a case of accessing data unrelated to a function executed by a user, a case of having an access authority for data unrelated to a function of an application, and a case in which data access occurs by an application that has not been executed for a predetermined period of time or longer. According to an embodiment, the processor 210 may map information on whether an access event has an abnormal behavior with event information of the corresponding event so as to store the mapped information in the memory 250, and may distinctively store a normal access event and an abnormal behavior access event in the memory 250.

According to various embodiments, when an access event occurs, the processor 210 may provide notifications in various ways so as to enable a user to immediately identify the occurrence of the access event and take action for the same. For example, occurrence of a data access event may be notified via light, vibration, notification sound, etc. for a specific area (e.g., an edge area) of the display 220. In addition, an abnormal behavior access event may be notified differently from a normal access event. The embodiments will be described in more detail with reference to FIGS. 5A, 5B, and 5C.

According to various embodiments, when event information is stored, the processor 210 may encrypt the information. An encryption scheme may include at least one of a data encryption standard (DES), a triple-DES, and an advanced encryption scheme (AES), but is not limited thereto. Later, when a user inquiries about encrypted information, the inquiry may be made via authentication by using a scheme selected by the user. For example, the inquiry is made after performing decryption by selecting at least one authentication scheme among fingerprint recognition, iris recognition, FaceID, a password, a pattern, and a gesture.

According to various embodiments, when an access event of an application occurs, the processor 210 may store information related to the access event in the memory 250. The processor 210 may acquire an application execution screen in response to detection of the access event, in order to audio-visualize and store information related to the access event. For example, when the access event occurs, the processor 210 captures an image of an execution screen of the corresponding application, which is input to the display 220. Alternatively, the processor 210 may store image information drawn on the surface by the application. The processor 210 may store the application execution screen in the form of a thumbnail and map the same with event information indicating the access event, so as to store the mapped thumbnail with information in the memory 250. Here, the event information may include the application accessing a resource, and at least some of the accessed resource, an access time, read information, and the presence or absence of an abnormal behavior for the access event generated by the application.

According to various embodiments, when an access event continuously occurs, the processor 210 may store a video of an execution screen during execution of an application. To this end, the processor 210 may determine whether an access event by an application continuously occurs.

According to an embodiment, when an access event occurs, in order to auralize and store information related to the access event, the processor 210 may map event information and sound information including at least some of voice information acquired via a microphone and a sound signal generated by an application, so as to store the mapped information.

According to various embodiments, the processor 210 may display, on the display 220, a first screen and a second screen related to access events occurring in various applications.

According to various embodiments, the first screen may include at least one piece of event information, an execution screen of an application, which is mapped with the event information, and an event list which may be configured according to an occurrence time of an access event. For example, the processor 210 displays, in units of respective access events, at least one of an icon indicating an application, access event information, or an execution screen of the application, which is captured when an access event occurs. According to an embodiment, information related to an access event may further include an icon indicating sound information.

According to various embodiments, the processor 210 may determine an arrangement criterion for the event list of the first screen, based on a user input. For example, according to a user's selection, access events is listed in the order of occurrence time, arranged for each application, or arranged for each accessed resource.

According to various embodiments, the processor 210 may configure the first screen in the order of occurrence time of each access event. For example, if access to a calendar by a messenger application, access to location information by a navigation application, access to the microphone by a call application, and access to an address book by the messenger application occur, the processor 210 displays the same on the first screen in the order of respective access events.

According to various embodiments, the processor 210 may classify and list information on respective events for each application. For example, the processor 210 classifies respective access events for each application so as to list the same vertically (or horizontally), and may display, in units of respective access events, at least one of an icon indicating an application, an access event occurrence time, or an execution screen of an application, which is captured when an access event occurs.

According to various embodiments, the processor 210 may, while classifying event information for each application, classify and list the event information in the order of occurrence time of access events of respective applications. For example, when a first access event by a first application, a second access event by a second application, and a third access event by the first application occur sequentially, the processor 210 records information on respective access events sequentially in the memory 250. The processor 210 may classify the sequentially stored first to third access events into the first and third access events of the first application and the second access event of the second application in units of applications, and may list the same in the order of applications.

According to various embodiments, when configuring the first screen, the processor 210 may display some of the event information together with an icon indicating an application and an execution screen, according to a user's selection. For example, information on at least one of an access event occurrence time, an accessed resource, an access frequency, and the presence or absence of an abnormal behavior may be displayed according to a selection of a user. According to an embodiment, the electronic device 200 may allow a user to configure a type of event information to be displayed on the first screen in a setting menu.

According to various embodiments, the processor 210 may classify and list each event information for each resource accessed via an access event. According to an embodiment, the processor 210 may display at least one of a time at which a corresponding application accesses a resource and the number of times of accessing the resource, on one side of an icon indicating the application. If an access event is continuously performed, a time at which the access event has occurred and a time at which the access event has ended may be displayed together.

According to various embodiments, the processor 210 may display only an access event which has occurred under a specific condition based on a user input. The first screen may include, in the event list, an upper banner indicating a condition based on a user input and a lower box displaying thumbnails of applications satisfying the condition. For example, a user configures displaying of only a currently occurring access event. According to an embodiment, the processor 210 may further display information on an access event in the lower box.

According to various embodiments, the processor 210 may display only an access event occurring within a predetermined time according to a user's setting. For example, if a user has configured to view an access event that occurred 10 minutes ago for a map application, an access event that occurred 3 minutes ago for the messenger application, and an access event that occurred during the last 5 minutes for a cloud application currently accessing a resource, only the messenger application and the cloud application may be displayed in the lower box on the first screen.

According to various embodiments, the first screen may further include a first timestamp bar indicating an application having accessed data for each time slot. For example, the first timestamp bar displays, in chronological order, an application icon or an icon indicating a resource for each access event. The first timestamp bar may summarize and indicate access events for a predetermined period according to a user's setting. For example, if a user configures the predetermined period to be one day, the first timestamp bar indicates a summary of access events having occurred during one day and is reset on the next day. The first timestamp bar may further include some of event information according to a user's setting. An example of the first screen will be described in more detail with reference to FIGS. 6A, 6B, and 6C.

According to various embodiments, the processor 210 may display the second screen based on a user input on the first screen displayed on the display 220. For example, if a user touches at least one of event information, an execution screen, or a thumbnail of an application while the first screen is displayed, the processor 210 displays the second screen corresponding to the event information.

According to various embodiments, the second screen may include an application execution screen and an authority control menu. Here, an execution screen of an application may be at least one of a captured image and a recorded video when an access event occurs, and an icon indicating that a call is in progress. The processor 210 may control at least one of whether to revoke an authority of an application, whether to allow access only for an application running in the foreground, and whether to delete an application, according to a user input in the authority control menu.

According to various embodiments, the processor 210 may determine whether the access event has occurred continuously, and may configure the second screen differently according to the determination. If the access event occurs discontinuously, the second screen may include an application execution screen and the authority control menu. If an access event of the application occurs multiple times, when the screen is swiped horizontally, or arrow buttons on the left and right are touched, a subsequent or previous execution screen may be displayed. Numbering indicating a number for a currently displayed execution screen may be displayed at the bottom of the execution screen.

According to various embodiments, if the access event occurs continuously, the processor 210 may store a video of an execution screen of an application in the memory during the occurrence of the access event, and may display the execution screen, the video of which has been stored, on the second screen. According to an embodiment, the processor 210 may generate the second screen including a second timestamp bar specifically indicating a resource, which the application has accessed, for each time slot. The second timestamp bar may include a character or an icon indicating a resource accessed by an application, and may distinctively display the same by shade and color. For example, if an application accesses location information, an address book, and a camera in sequence, the processor 210 divides the second timestamp bar by different shades or colors according to the location information, the address book, and a time at which the camera accesses a resource, and may display characters or icons indicating the location information, the address book, and the camera in each part.

According to various embodiments, a time mark indicating a time at which an application accesses each resource may be displayed on one side of the second timestamp bar. When a user inquiries about a corresponding time slot of the second timestamp bar, the processor 210 may reproduce video or audio information recorded in the time slot.

According to various embodiments, the processor 210 may configure a setting menu enabling to change configurations for stored data, notifications, and the like according to a user's selection. The setting menu may include at least one of a notification setting menu for configuration of a notification method and an event storage setting menu for configuration of a stored record. The notification setting menu may enable configuration of a notification only for an abnormal behavior event, a data capacity saving mode, a notification only for a specific app, a notification only for specific authority access, a notification only for an access event in a specific time slot, etc., and the event storage setting menu may enable configuration of whether to encrypt an event storage space, an event storage duration, etc., as desired by a user.

According to various embodiments, respective items of the setting menus may be placed together with toggle switches enabling selection of enabling/disabling of the items. A user may swipe or touch a toggle switch so as to change a configuration of a corresponding item. For example, if a user desires to be notified of only an abnormal behavior access event and desires to disable encryption of the event storage space, configurations is changed by turning on a toggle switch for "notification only for abnormal events" and turning off a toggle switch for "event storage space encryption".

According to various embodiments, when a notification method item is touched, a notification method may be configured. For example, the notification method configured to be an edge light may be configured to be notification using a notification sound, and the notification sound is configured separately when a normal access event occurs and an abnormal behavior access event occurs.

According to various embodiments, a user may configure event record storage via the event storage setting menu. For example, the event record storage is configured so that information of a normal access event is stored for a month and then automatically deleted thereafter, and an abnormal behavior access event is not deleted.

Figure 3:
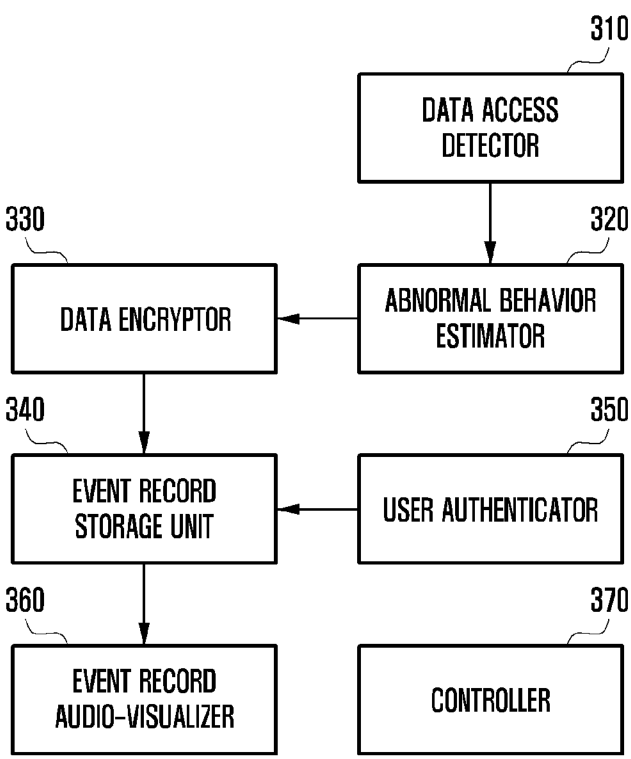
FIG. 3 is a flowchart of each element of an electronic device for access event visualization according to an embodiment of the disclosure.

FIG. 3 is a flowchart of each element of an electronic device for access event visualization according to an embodiment of the disclosure.

A data access detector 310, an abnormal behavior estimator 320, a data encryptor 330, an event record storage unit 340, and a user authenticator 350, which are illustrated in FIG. 3, may be software modules executable by a processor (e.g., the processor 210 of FIG. 2).

According to various embodiments, an electronic device (e.g., the electronic device 200 of FIG. 2) may execute one or more applications. For example, while one application is running, if another application is executed by a user input, the electronic device 200 continues executing the previously running application in the background without terminating the same.

According to various embodiments, while a user is using the electronic device 200, an access event in which an application accesses a corresponding resource may occur. For example, when a user moves from a current location to a destination, in order to execute a navigation function, the map application inquires about location information or the user or may use the camera to use a biometric password registered in a security-related application. According to various embodiments, an access event may occur even when an application is running in the background.

According to various embodiments, when an access event occurs by an application running in the electronic device 200, the data access detector 310 may detect the event.

According to various embodiments, the abnormal behavior estimator 320 may determine whether the detected access event is a normal access event or an abnormal behavior access event. The abnormal behavior estimator 320 may determine, from among detected access events, at least one of cases as an abnormal behavior, the cases including a case in which an application in a background state accesses data a determined number of times or more, a case of accessing data unrelated to a function executed by a user, a case of having an access authority for data unrelated to a function of an application, and a case in which data access occurs by an application that has not been executed for a predetermined period of time or longer. For example, if the map application accesses financial information, it is determined to be an abnormal behavior.

According to various embodiments, the abnormal behavior estimator 320 may provide a notification to a user in various ways when an access event occurs. For example, occurrence of an access event is notified to a user by methods including edge light of a display, vibration, notification, a notification sound, and the like.

According to various embodiments, when an abnormal behavior access event occurs, the abnormal behavior estimator 320 may notify of the same in a form different from a normal access event notification. For example, compared to when a general access event occurs, a larger vibration is generated or a different notification sound may be made. A user may control a setting menu so as to configure a specific setting for notification.

According to various embodiments, the data encryptor 330 may encrypt an application execution screen and event information relating to an access event. Since detected data may be closely related to a user's personal information, the detected data may be stored via encryption.

According to various embodiments, the event record storage unit 340 may acquire and store an application execution screen. If the access event occurs continuously, an application execution screen may be recorded or voice information received via the microphone 240 may be recorded, while the access event occurs. If the access event occurs discontinuously, an application execution screen may be captured to enable identification of a type of action that a user has performed at a corresponding time.

According to various embodiments, the event record storage unit 340 may map event information, which includes specific information on an access event by a user, with an application execution screen so as to store the same in the memory 250. For example, the event information includes at least one of a time at which an application accesses data of the electronic device 200, an access authority type, the presence or absence of an abnormal behavior, and a data access frequency of a corresponding application, and the event record storage unit 340 may map and store event information with an execution screen of an application. According to an embodiment, the event record storage unit 340 may store only an abnormal behavior access event in the memory 250 by distinguishing the same from a normal access event.

According to various embodiments, the user authenticator 350 may decrypt data, which is stored via encryption, via authentication through a user input. In this case, at least one of a fingerprint, an iris, FaceID, a password, a pattern, and a gesture may be used as an authentication scheme, so as to perform authentication and decryption. Encryption and authentication schemes are not limited to the mentioned schemes.

According to various embodiments, an event record audio-visualizer 360 may display a first screen and a second screen related to an access event of an application on the display 220.

According to various embodiments, the event record audio-visualizer 360 may display a first screen on the display 220 when a user executes the disclosure. The event record audio-visualizer 360 may arrange and display an event list of the first screen according to a criterion configured by a user.

According to various embodiments, the event record audio-visualizer 360 may display the second screen on the display 220, based on a user input on the first screen. For example, if at least one of an application thumbnail, an application execution screen, or event information, which are displayed on the first screen, are inquired, the second screen related to a corresponding access event may appear on the display.

According to various embodiments, the controller 370 may provide an authority control menu to enable a user to take continuous actions on an application after identifying an event record. For example, the user takes an action, such as revoking a specific authority for the application, allowing access only in the foreground, or deleting the application. Via the controller 370, a user may identify an access event and take an action for the same at once without having to perform another operation from the outside.

According to various embodiments, a control menu may be included in a part of a first screen or a second screen, and a user may move to the control menu via a gesture, such as dragging, swiping, or touching.

Figure 4:
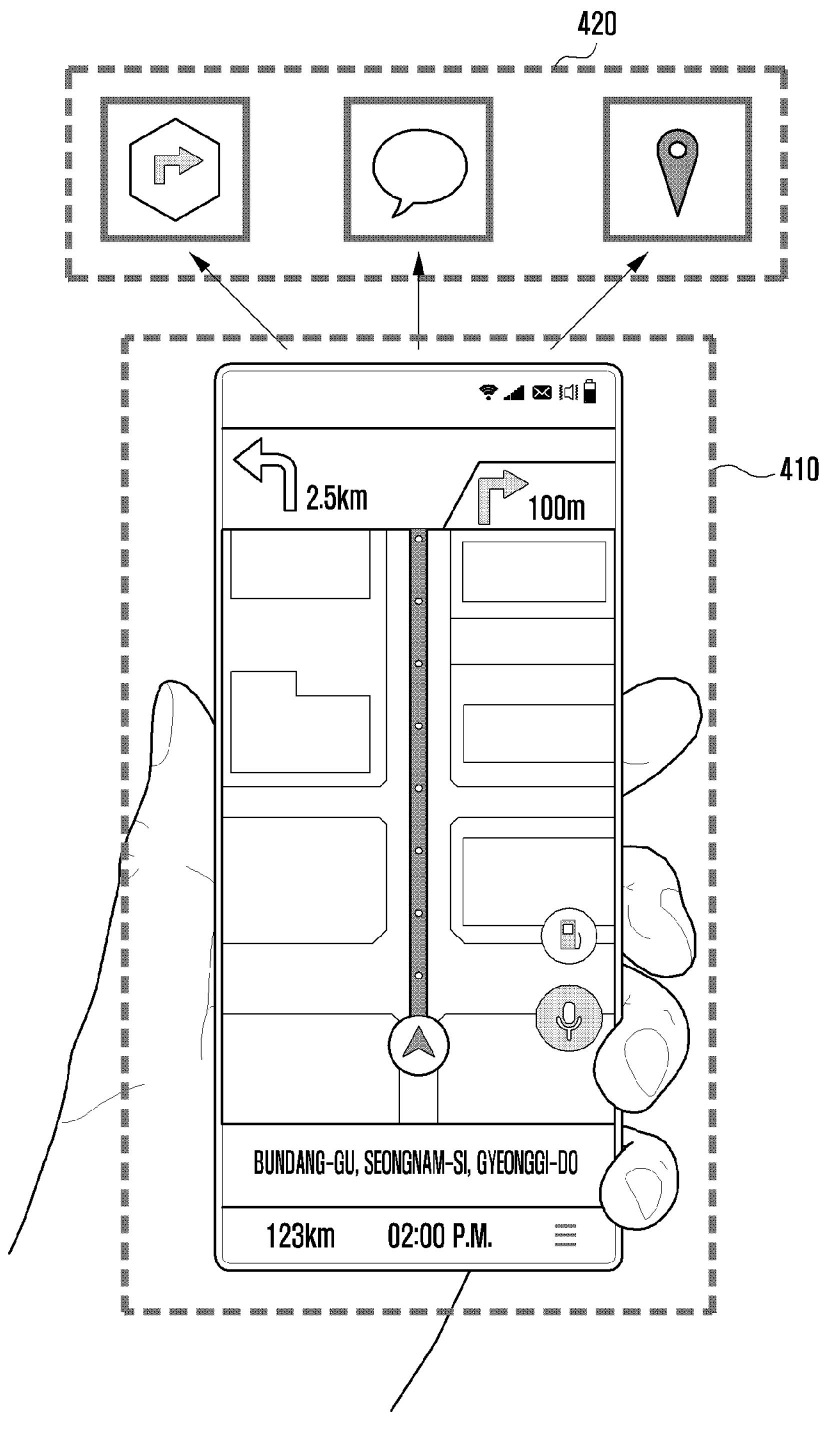
FIG. 4 illustrates a screen showing an access event when an application is executed, according to an embodiment of the disclosure.

FIG. 4 illustrates a screen showing an access event when an application is executed, according to an embodiment of the disclosure.

According to various embodiments, when an application is executed in the electronic device 200, an event in which the application accesses data, such as personal information, may occur. For example, if the navigation application is executed, the application accesses location information of the electronic device 200 or may access camera information.

According to various embodiments, only one access event may be generated or various access events may be generated by a running application. Access events may be generated by various applications in addition to an application running in the foreground of the electronic device 200.

According to various embodiments, even if a first application 410 is running in the foreground, an access event may be generated by a second application 420 running in the background. Referring to FIG. 4, while an event in which the first application 410 running in the foreground of the electronic device 200 accesses location information occurs, an event in which the second application 420 running in the background accesses the camera, location information, and calendar information may occur. The electronic device 200 may store, in the memory, a record of an access event by an application running in the foreground or background.

Figure 5A:
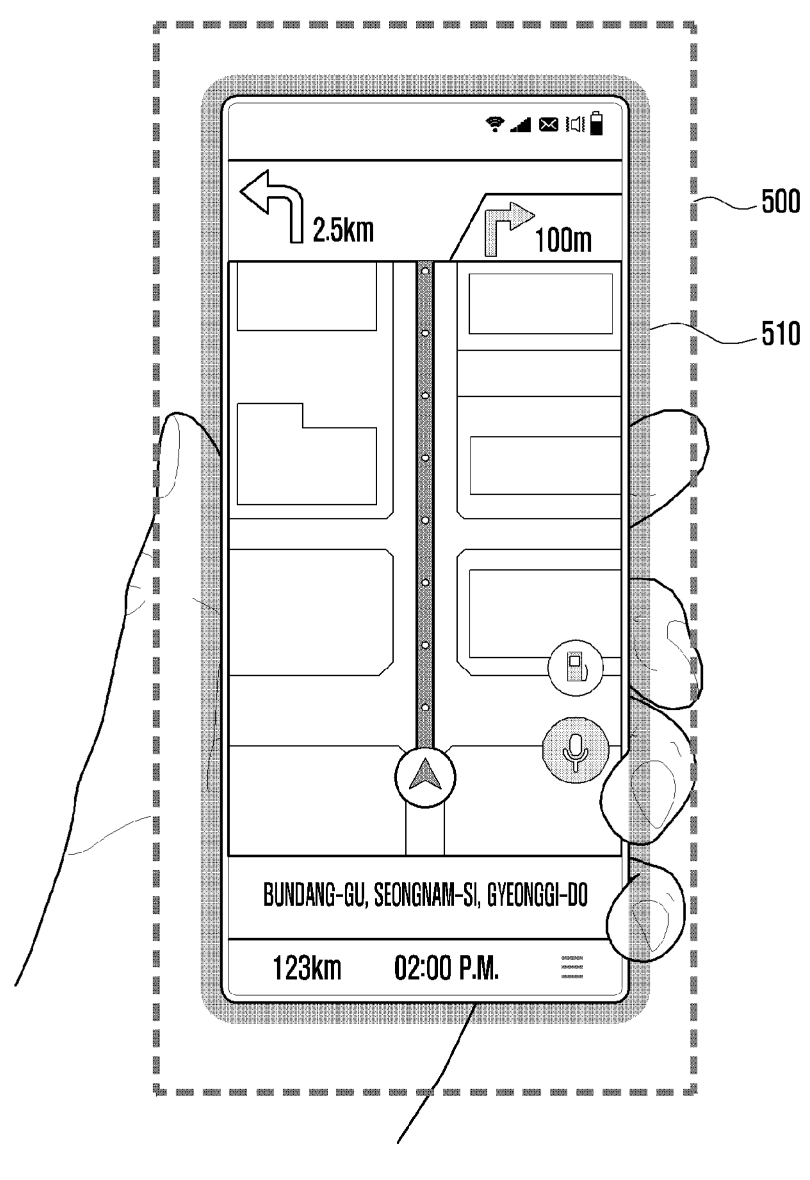
FIGS. 5A, 5B, and 5C illustrate an access event notification method according to various embodiments of the disclosure.
Figure 5B:
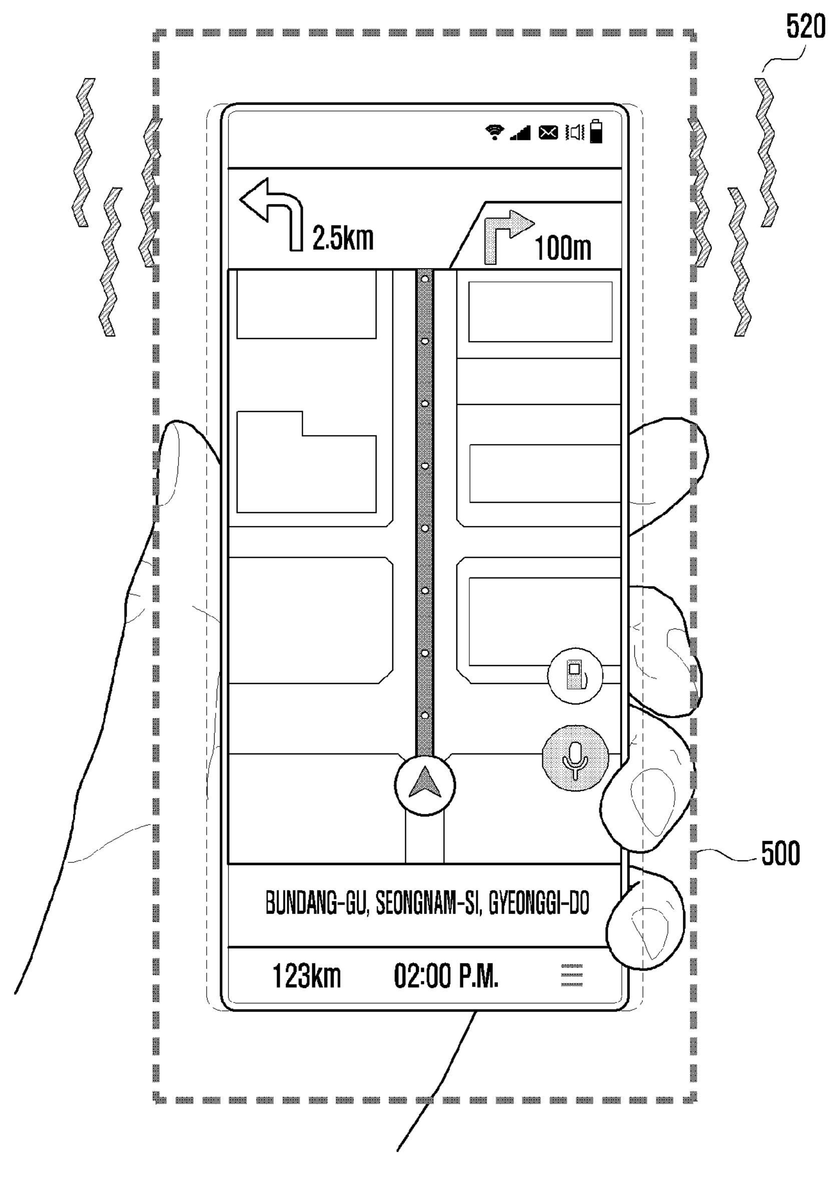
Figure 5C:
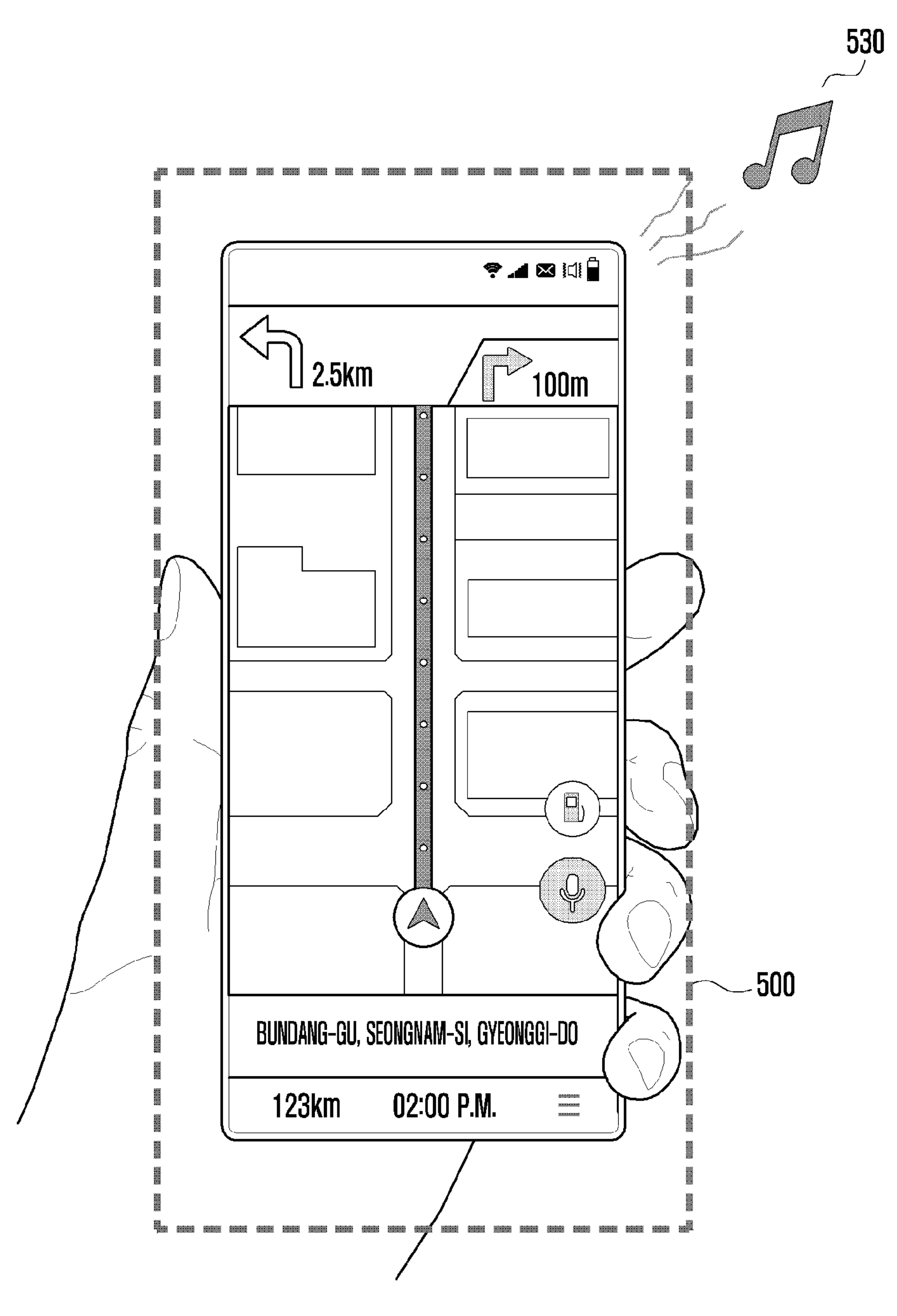

FIGS. 5A, 5B, and 5C illustrate an access event notification method according to various embodiments of the disclosure.

Referring to FIGS. 5A, S5B, and 5C, the processor 210 may detect occurrence of an access event, and the electronic device 200 may notify a user of the same in various ways.

Referring to FIG. 5A, the processor 210 may provide a notification by a method of turning on a light 510 at the edge of the electronic device 200. Although FIG. 5A illustrates only a method of turning on the light 510 at the edge of the electronic device 200, the disclosure is not limited thereto. For example, instead of an edge part, the full screen is turned on, or only a part of the screen may be turned on. In addition, various colors of light may be turned on instead of one color, and colors may vary over time. A level of brightness may also vary over time.

According to various embodiments, different lights may be turned on according to a normal access event and an abnormal behavior access event. For example, it is configured that blue light is emitted for a normal access event, but red light is emitted for an abnormal behavior.

Referring to FIG. 5B, the processor 210 may provide a notification to the electronic device 200 by a method of generating a vibration 520. A notification may be provided by changing a vibration pattern and a vibration time and intensity in various ways, and even in a case of the vibration 520, different notifications may be provided by distinguishing a normal access event and an abnormal behavior access event. For example, in a case of an abnormal behavior access event rather than a normal access event, a notification sound is generated for a long time by configuring a long vibration, and in a case of accessing data in the foreground, a relatively small vibration may be configured to be generated compared to a case of accessing data in the background. In addition, if an access event to a selected resource occurs, a stronger vibration may be configured to be generated.

Referring to FIG. 5C, the processor 210 may provide a notification by a method of generating a notification sound 530. The notification sound 530 may be notified in various ways by changing a type, a high and low, a pattern, and a size of the notification sound 530. It may be configured that a higher volume is generated for an abnormal behavior access event compared to a normal access event, and different notification sounds are generated for a case of accessing in the background and a case of accessing in the foreground.

According to various embodiments, a method of notifying a detected access event by the processor 210 is not limited to the methods of FIGS. 5A, 5B, and 5C, and the respective methods may not be used independently of each other. For example, the notification sound 530 may be generated at the same time when the light 510 on the edge is turned on, or the vibration 520 and the notification sound 530 may be concurrently turned on.

Figure 6A:
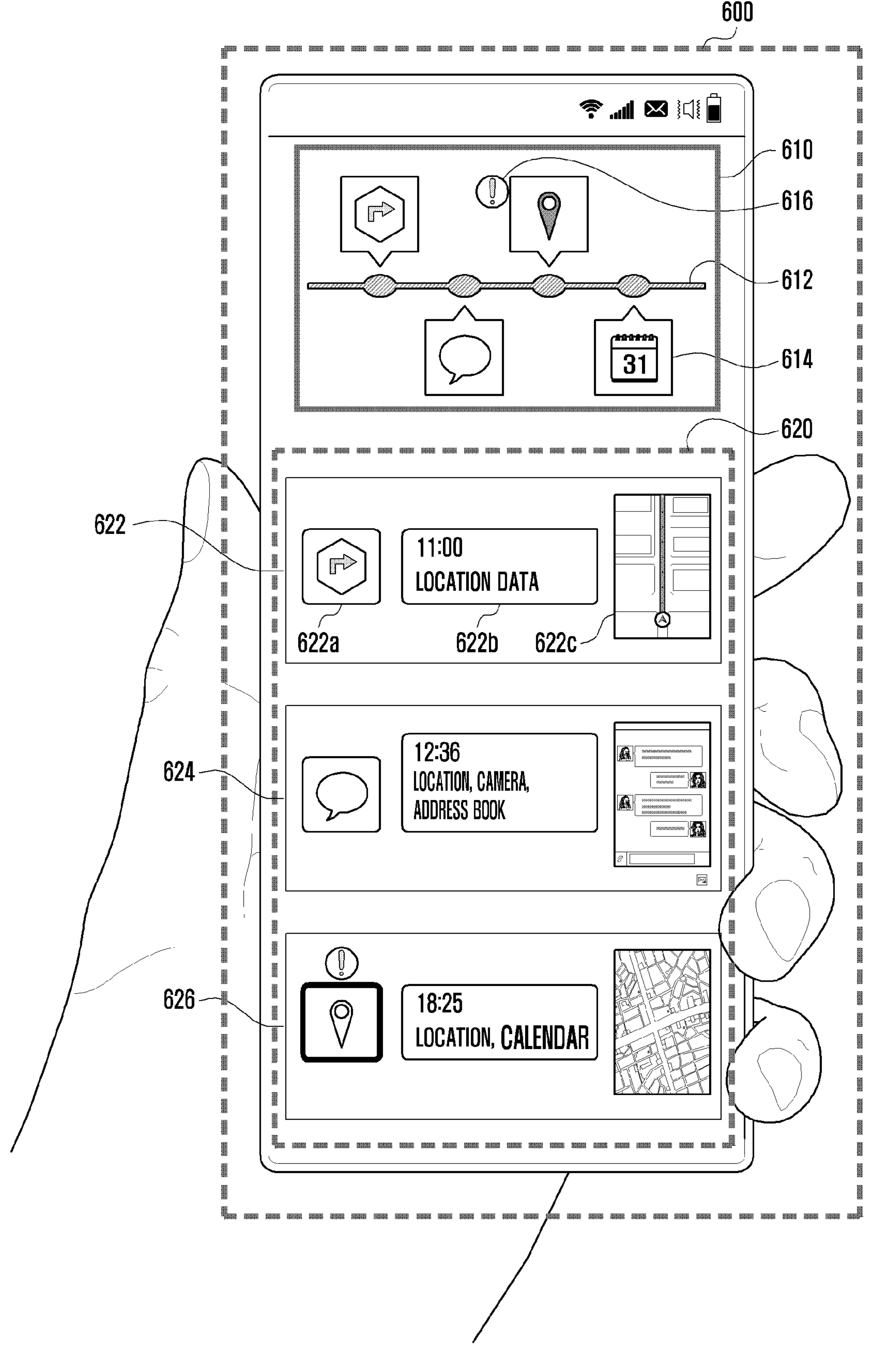
FIGS. 6A, 6B, and 6C illustrate examples of a first screen configuration scheme according to various embodiments of the disclosure.
Figure 6B:
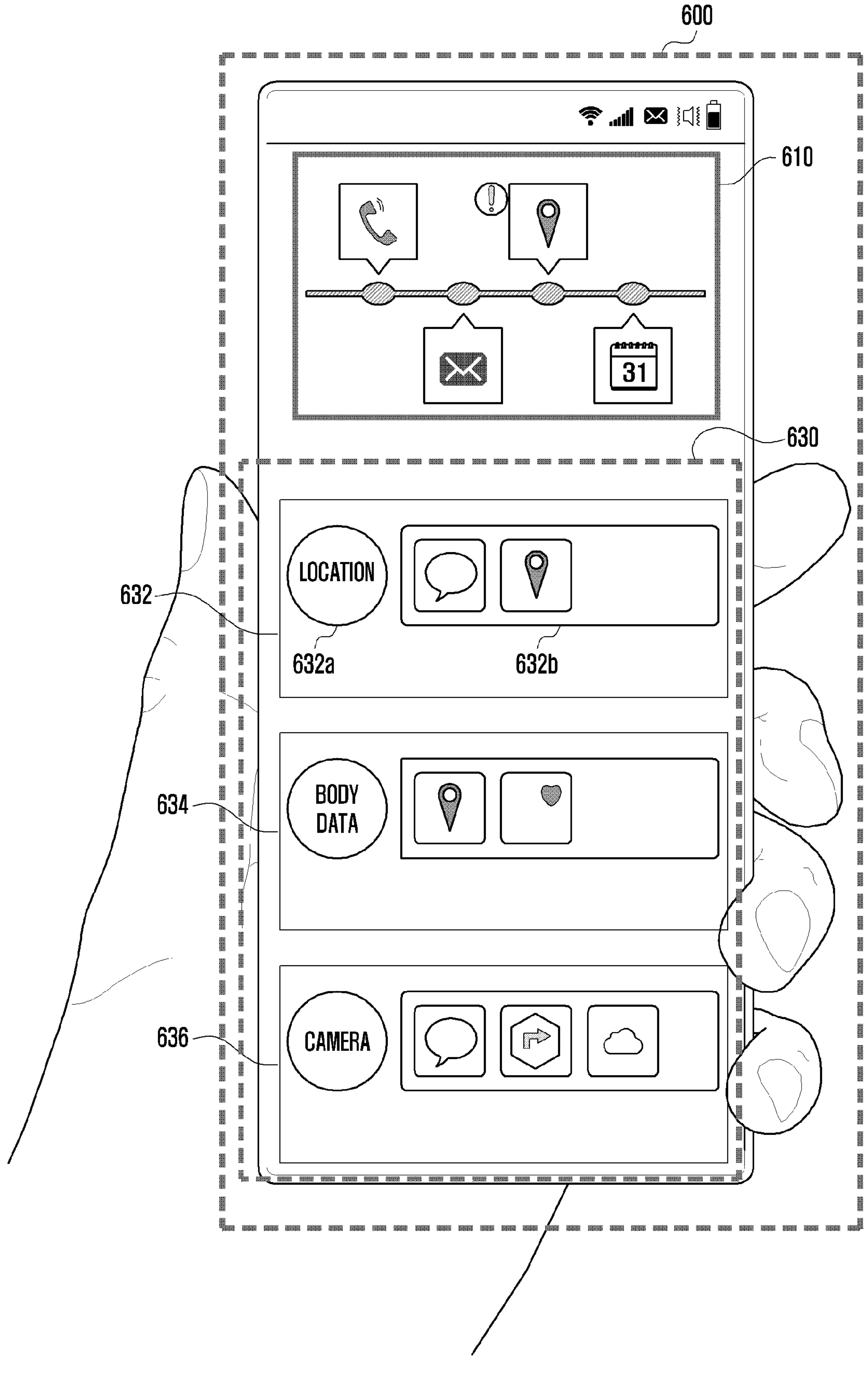
Figure 6C:
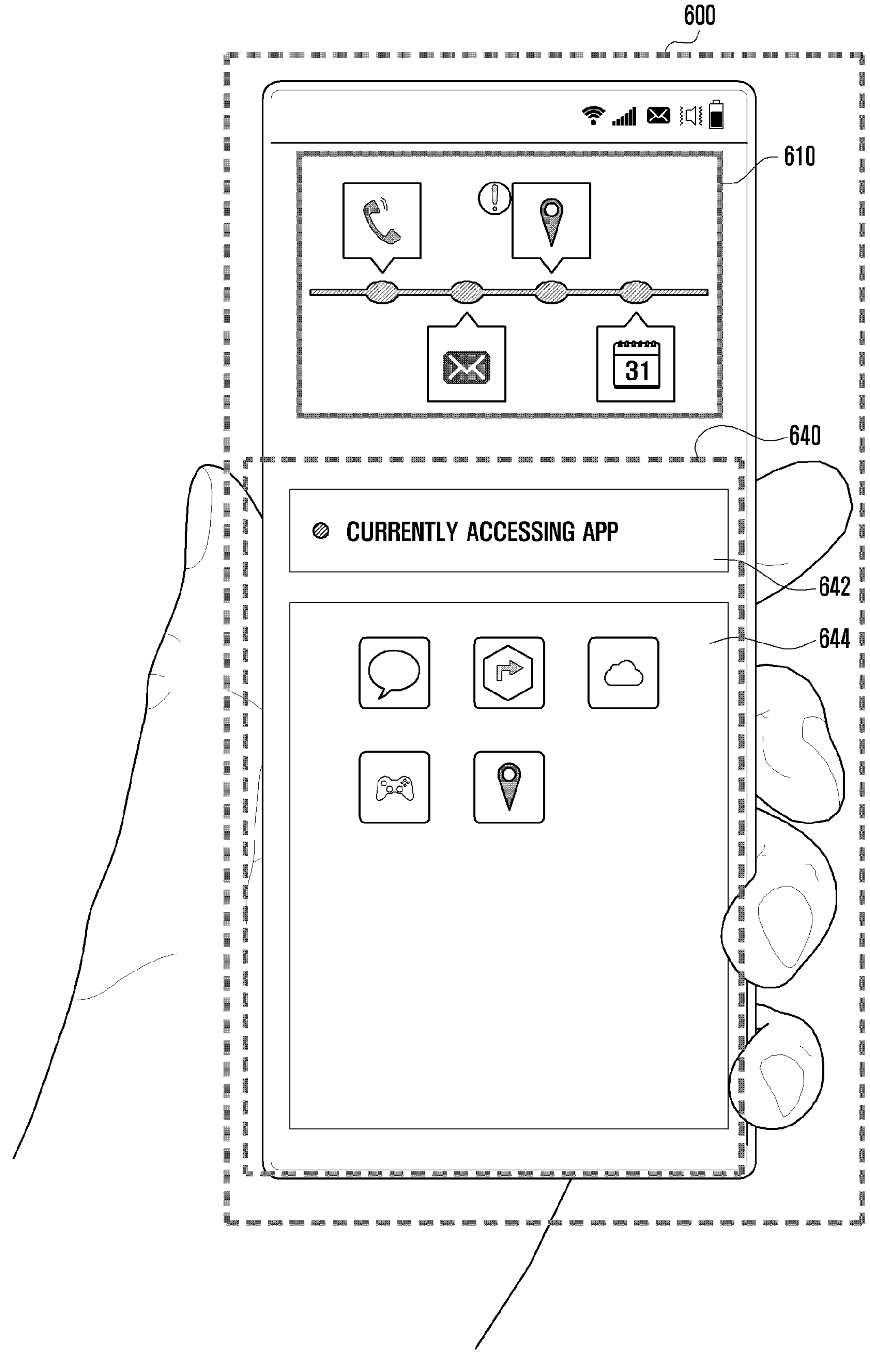

FIGS. 6A, 6B, and 6C illustrate examples of a first screen configuration scheme according to various embodiments of the disclosure.

Referring to FIG. 6A, the processor 210 may configure a first screen 600 including at least one of a first timestamp bar 610 and an event list 620. The embodiment is not limited to illustration in FIG. 6A.

According to various embodiments, the first screen 600 may include the event list 620 including event information and an application execution screen mapped thereto. The event information may include at least one of a time at which an application accesses data of the electronic device 200, an accessed resource, the presence or absence of an abnormal behavior, and the number of times of data access of the application. In a setting menu, event information to be displayed on the first screen 600 may be selected according to a user's setting. An application execution screen may be obtained by capturing or recording an execution screen at the time when an event of accessing data by a corresponding application has occurred, or may be a picture (e.g., a phone icon) indicating that a call is in progress if a voice is recorded.

According to various embodiments, the processor 210 may arrange and display access events in chronological order of occurrence of the respective access events. According to an embodiment, the processor 210 may place the most recently occurred access event at the top of the event list 620, and previously occurred access events may be placed toward the bottom.

According to various embodiments, the processor 210 may arrange continuously occurring access events, based on the time at which the access events are terminated. For example, if the navigation application accesses location information continuously for 10 minutes, even if the map application accesses the calendar in the meantime, the navigation application is positioned higher.

Referring to FIG. 6A, the processor 210 may classify and list access events for each application. For example, when the navigation application accesses location information, the messenger application accesses location information, the camera, and the address book, and the map application accesses location information and the calendar, access events may be classified and displayed for each application. According to an embodiment, the first screen 600 may include a thumbnail indicating an application, event information, and an application execution screen. The event information may display at least one of a resource accessed by a corresponding application and an access time, based on a user's setting. Here, if there is a difference in a time at which the application accesses each resource, the access time to a corresponding resource may be displayed together, or in a case of concurrent access, only one time may be displayed.

Referring to FIG. 6B, the processor 210 may classify and list access events for each resource. An event list 630 may include at least one of an icon 632*b* indicating a resource and an icon 632*a* of an application accessing the resource. If multiple access events occur, information on the access events may be arranged vertically (or horizontally). According to an embodiment, configuration of the event list 630 is not limited to the drawing. For example, a thumbnail indicating a resource is positioned at the top of the screen, and an application thumbnail may be positioned at the bottom.

According to various embodiments, if a fourth access event 632 for location information by the messenger application and the map application, a fifth access event 634 for body data information by the map application and a health application, and a sixth access event 636 for camera information by the messenger application, the navigation application, and the cloud application occur, the processor 210 may, while classifying the fourth access event 632, the fifth access event 634, and the sixth access event 636 for each accessed resource and listing the same vertically (or horizontally) in the first screen 600, display at least one of icons indicating resources and icons indicating applications accessing corresponding resources.

According to various embodiments, when configuring the first screen by classification for each accessed resource, the processor 210 may list icons indicating an application in chronological order of accessing respective resources. For example, if the sixth access event 636 occurs in the order of the messenger application, the navigation application, and the cloud application, the processor 210 may, while listing access events for camera information, sequentially arrange the messenger application, the navigation application, and the cloud application horizontally (or vertically).

According to various embodiments, when listing resources, the processor 210 may list the same vertically (or horizontally) in the order of the number of occurrences of the access events. For example, if an access event for the location data occurs the most, and the number of occurrences is decreased in the order of the body data and the camera, the processor 210 configures a second screen 700 by sequentially arranging the fourth access event 632, the fifth access event 634, and the sixth access event 636.

Referring to FIG. 6C, the processor 210 may display, on the first screen 600, only an access event that occurred under a specific condition, based on a user input. For example, FIG. 6C illustrates a case in which a user configures only a currently accessing event to be displayed. In an event list 640, a top banner 642 may display a condition (e.g., a currently occurring access event or an abnormal behavior access event) configured by a user, and only an access event that meets the condition may be displayed in a bottom box 644.

According to various embodiments, if only a currently occurring access event is displayed, at least one of a type of a resource being used by an accessing application, an access time, and information on whether the application is running in the background or foreground may be included.

According to various embodiments, the first screen 600 may include the first timestamp bar 610 displaying an access event occurring during a time configured by a user. The first timestamp bar 610 may be formed in which an icon 614 indicating occurrence of an event is displayed on a bar 612 indicating a time flow. The first timestamp bar 610 may display, in chronological order, access events displayed in the event list 640, and the displayed access events may vary according to an arrangement scheme of the first screen 600. For example, if classification and listing are performed for each application in the first screen 600, all access events occurring during a time configured by a user are displayed in the event list 640. However, if the first screen 600 is configured to display only an access event that occurred during last one hour, only an access event that occurred within last one hour may also be displayed on the first timestamp bar 610.

Referring to FIG. 6A, the first timestamp bar 610 displays more recent events as moving from left to right in a horizontally long form, but is not limited thereto. For example, the bar 612 may be arranged vertically, and more recent events are displayed as moving from bottom to top. According to an embodiment, a bent part may exist in the middle of the first timestamp bar 610, and a time mark indicating a time at which each access event has occurred may be further included. If multiple access events occur, access events having occurred in a previous time slot or in a subsequent time slot may be identified by swiping the first timestamp bar 610 horizontally (or vertically).

According to various embodiments, if an access event is determined to be an abnormal behavior, separate indications may be made for a corresponding application and a corresponding access resource. For example, an abnormal behavior is indicated by displaying an application icon border in bold, changing a font of an abnormal behavior access event in event information, or adding a graphic object (e.g., an exclamation mark) indicating the abnormal behavior next to the icon. According to an embodiment, in order to indicate an abnormal behavior, separate indications may be made by displaying an icon border in bold or adding a graphic object (e.g., an exclamation mark 611) indicating the abnormal behavior also next to an icon in the first timestamp bar 610.

Figure 7A:
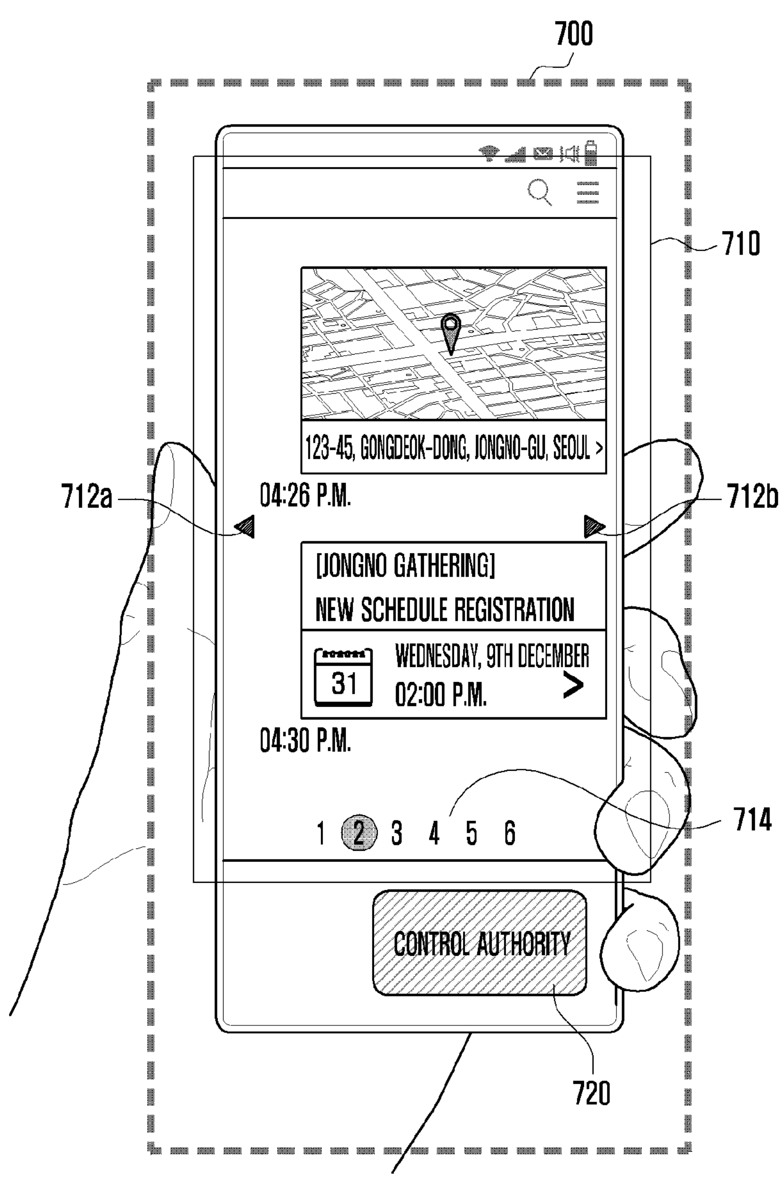
FIGS. 7A, 7B, and 7C illustrate examples of a second screen configuration scheme according to various embodiments of the disclosure.
Figure 7B:
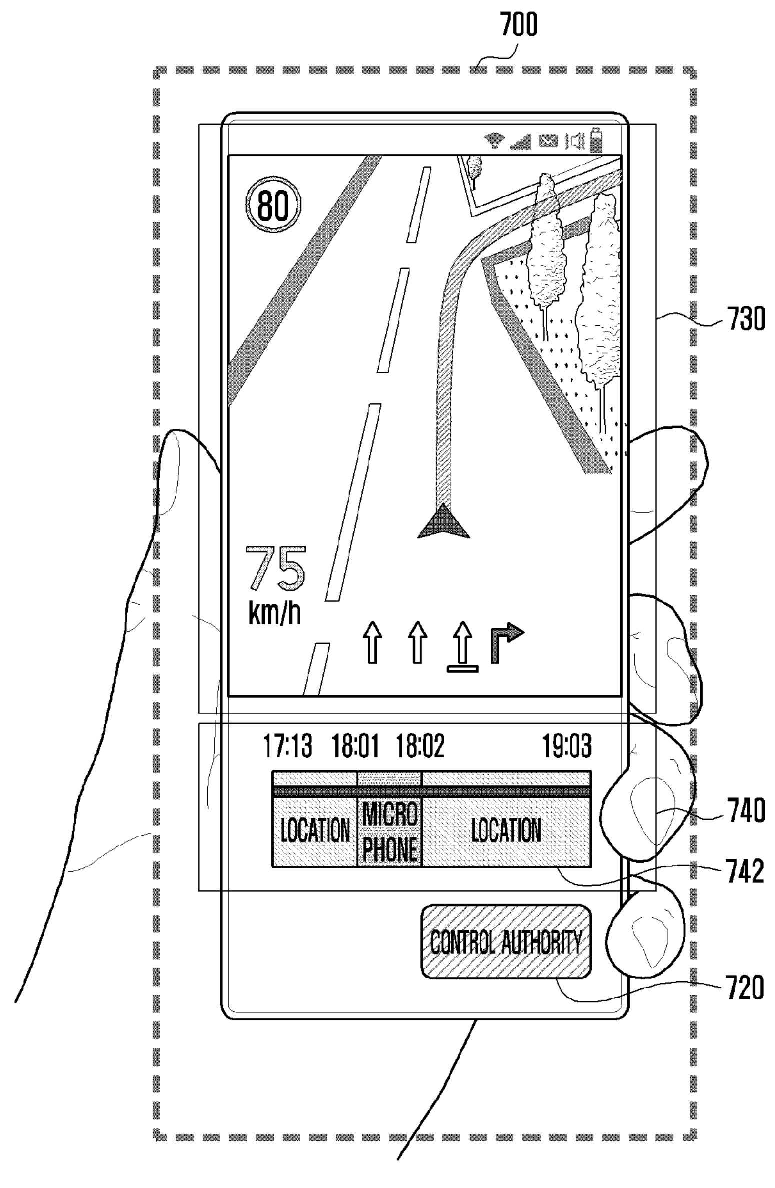
Figure 7C:
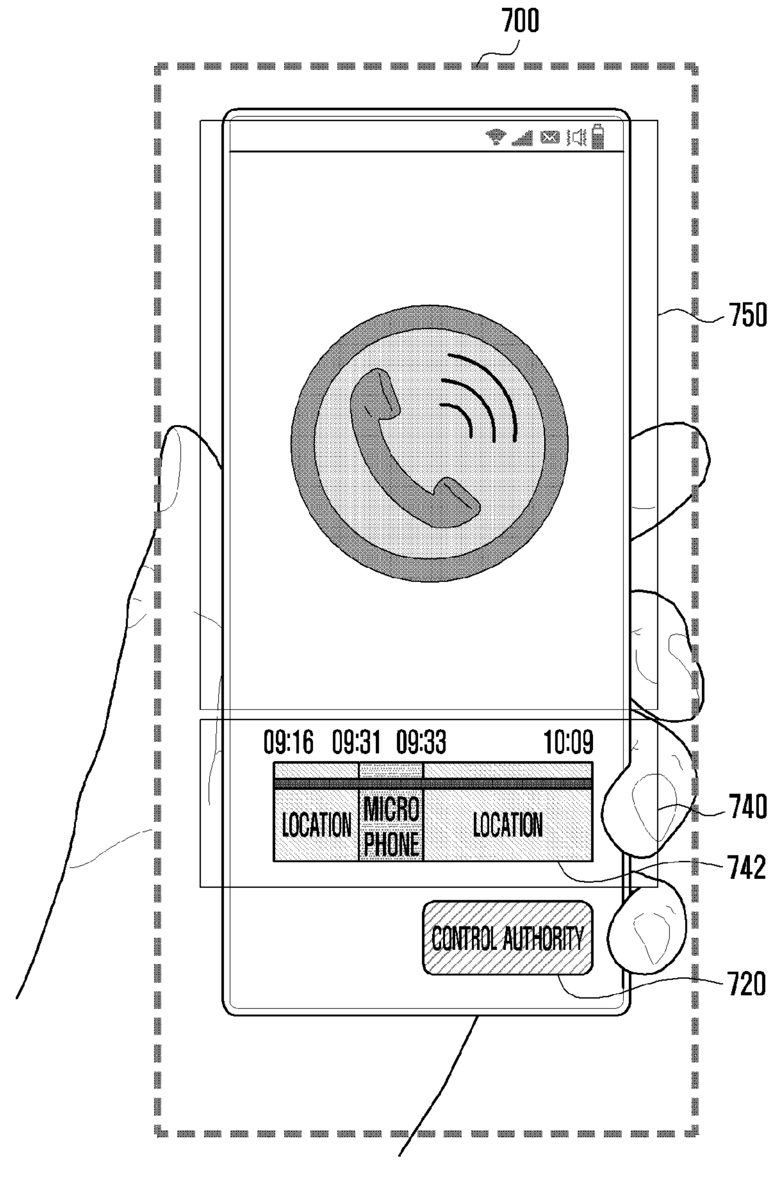

FIGS. 7A, 7B, and 7C illustrate examples of a second screen configuration scheme according to various embodiments of the disclosure.

According to various embodiments, the second screen 700 may include an authority control menu 720 and an application execution screen acquired when an access event occurs. The application execution screen may be an image 710 obtained by capturing a screen of the electronic device 200, a video 730 obtained by recording the same, and a call icon. If multiple access events occur in one application, execution screens of the applications, which are captured at respective time points, may be displayed on the second screen 700.

According to various embodiments, a screen configuration may be vary depending on whether the access event occurs continuously or discontinuously. If the accent event occurs discontinuously, an application execution screen may be captured and displayed in the form of the image 710. If an accent event occurs continuously, an application execution screen may be displayed as the video 730 as illustrated in FIG. 7B, and a second timestamp bar 740 showing resources accessed by the application in chronological order may be additionally included.

According to various embodiments, numbering 714 and buttons 712*a* and 712*b* may be additionally included in one side of the second screen 700, wherein the numbering indicates a sequence number for occurrence of an access number, which corresponds to the corresponding screen, and the buttons enable viewing and displaying of another execution display. In addition to viewing using the buttons 712*a* and 712*b*, another execution screen may be identified via a gesture, such as swiping the screen horizontally. Referring to FIG. 7A, if the messenger application accesses location information, the camera, the address book, the microphone, body data, and the calendar, application execution screens may be arranged according to an access time of a corresponding resource. Since a total of six access events have occurred, the numbering 714 may be displayed up to 6, and if an access event to the camera occurs second, 2 of the numbering 714 may be separately displayed using at least one of shade and color. The processor 210 may enable, if a user swipes the screen to the left, displaying of a subsequent execution screen, and 3 of the numbering 714 may be separately displayed.

According to various embodiments, one side of the second screen 700 may include the authority control menu 720 enabling an action to be taken for the corresponding application. The user may view the authority control menu 720 to configure a resource access authority for the application, may configure accessibility only in the foreground, and may take an action, such as deleting the application. Embodiments are not limited to those illustrated in the drawings. For example, the authority control menu 720 is placed at the top of the screen and an execution screen may be placed at the bottom of the screen.

Referring to FIG. 7B, if the access event occurs continuously, the second screen may include at least one of the video 730 obtained by recording an application execution screen, the second timestamp bar 740, and the authority control menu 720.

According to various embodiments, the second timestamp bar 740 may display resources accessed by the corresponding application in chronological order. In a case of accessing multiple resources, respective resources may be distinctively displayed using different shades and colors. In addition, a time at which a corresponding resource is inquired is displayed as a time mark 744 on one side, so that, when a corresponding time slot is inquired by a user input, a video of the corresponding time may be reproduced. For example, if the navigation application sequentially accesses location information, microphone information, and location information 742, the second timestamp bar 740 is divided into three parts by using at least one of shade and color. Each area may have a size proportional to a duration the application accesses a corresponding resource. A user may touch a part of the second timestamp bar 740 to reproduce audio and video of a corresponding time slot.

Referring to FIG. 7C, if an access event occurs during a call 750, the second screen 700 may include the second timestamp bar 740 and an icon indicating that the call is in progress. For example, if an event, in which a recording application accesses the microphone during the call, occurs, the processor 210 displays, on the second screen 700, the icon indicating that the call is in progress. In the same way as in the previous embodiment, a user may inquire about a part of the second timestamp bar 740 so as to reproduce a voice recorded in a corresponding time slot.

Figure 8:
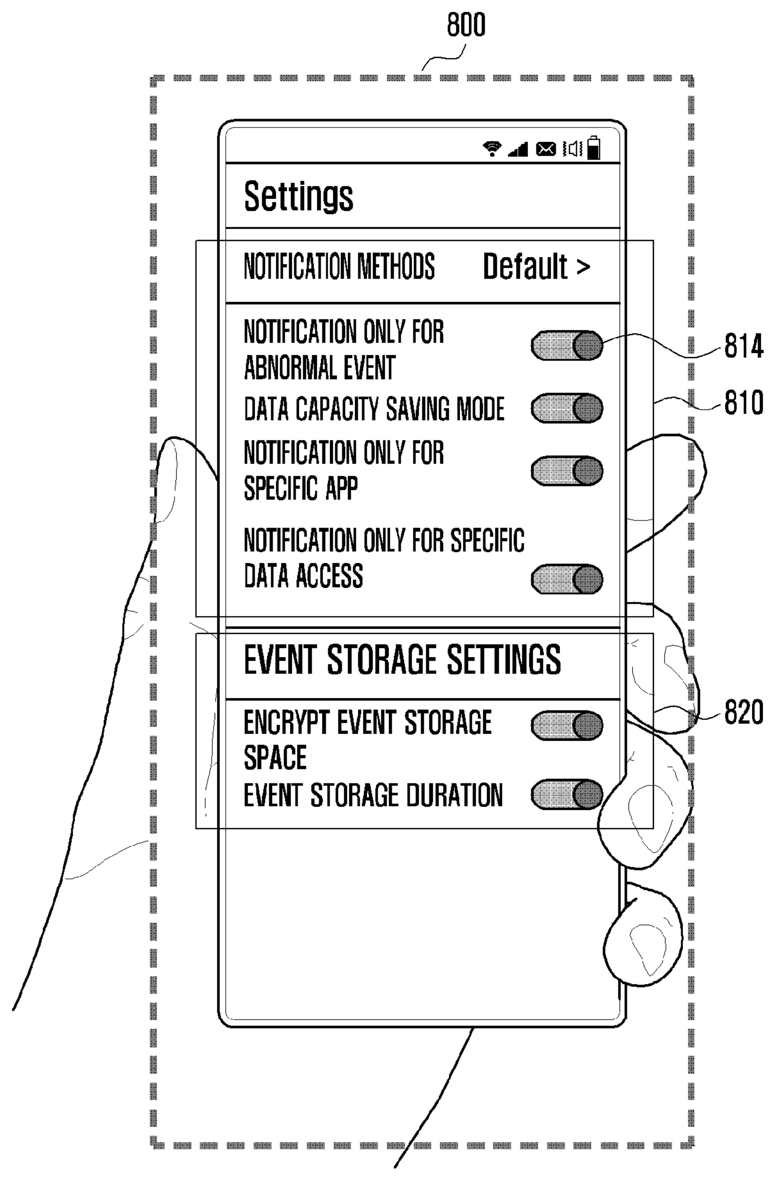
FIG. 8 illustrates an example of a setting menu according to an embodiment of the disclosure.

FIG. 8 illustrates an example of a setting menu according to an embodiment of the disclosure.

According to various embodiments, the processor 210 may display a setting menu 800 enabling configuration of at least one of a notification method and an event storage setting. The setting menu 800 may include at least one of items enabling to change functions of the disclosure and a toggle switch 814 enabling each item to be enabled. A user may view (e.g., a touch or a click) each item so as to configure specific details. The toggle switch 814 may be operated by touching or swiping, and each item may be enabled/disabled. For example, if a user desires to be notified of only an abnormal behavior access event occurring in the messenger application, the user enables an item for "notification only for abnormal events" and an item for "notification only for a specific app", touch the item of "notification only for a specific app", and select the messenger application.

According to various embodiments, the notification setting menu 810 may enable configuration of whether to notify of only an abnormal event, whether to switch to a data capacity saving mode, whether to notify of only a specific application, and whether to notify of only a specific resource access. For example, by viewing the notification setting menu 810, detailed settings for the edge light 510, the vibration 520, and the notification sound 530 is configured.

According to various embodiments, in an event storage setting menu 820, whether to encrypt an event storage space and an event storage duration may be configured. If event storage space encryption is disabled, an event storage space be accessed without authentication. Depending on a user's selection of the event storage duration, an event may be stored for a long time or may be immediately deleted without being stored.

Figure 9:
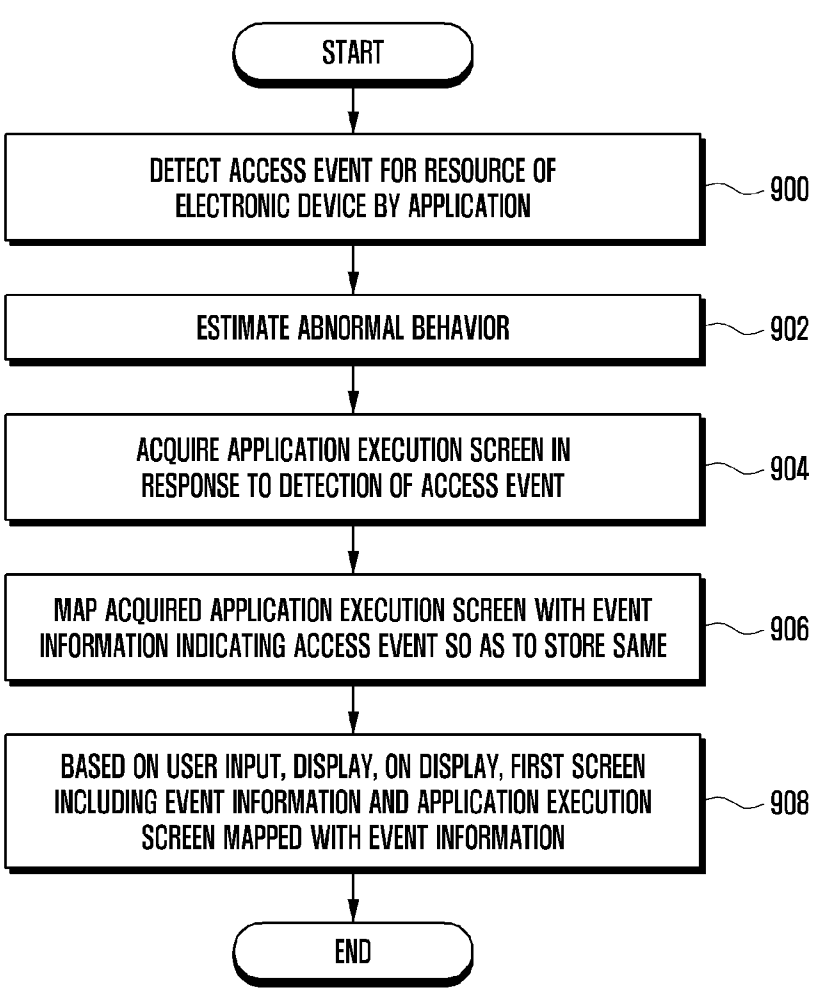
FIG. 9 is a flowchart of an access event visualization method according to an embodiment of the disclosure.

FIG. 9 is a flowchart of an access event visualization method according to an embodiment of the disclosure.

The illustrated method may be performed by an electronic device (e.g., the electronic device 200 of FIG. 2) described with reference to FIGS. 1 to 4, 5A to 5C, 6A to 6C, 7A to 7 C, and 8, and descriptions of the aforementioned technical features will be omitted below.

According to various embodiments, in operation 900, the electronic device 200 may detect an access event to a resource of the electronic device 200, which is generated by an application. Here, the access event may include cases in which an application uses a hardware function built in the electronic device 200, or uses, copies, deletes, moves, or inquires of information related to personal information.

According to various embodiments, a resource may include at least some of hardware and/or software of the electronic device 200. For example, when an application uses hardware resources, such as a microphone, a camera, Wi-Fi, and a memory read/write of the electronic device 200, or accesses resources related to personal information, such as body data, a body activity, location information, an address book, a camera, a calendar, a call record, and SMS, the electronic device 200 may detect the same. According to an embodiment, the application may provide a user interface enabling identification of whether access to the resources is allowed, when the application is at least one of installed, updated, or first executed, and even thereafter, whether access to the resources is allowed may be changed according to a user's selection. The electronic device 200 may allow access to a corresponding resource according to a selection of the user.

According to various embodiments, in operation 902, the electronic device 200 may determine whether the detected access event of the application has an abnormal behavior. Here, the abnormal behavior may include, from among detected data access events, at least one of a case in which an application in a background state accesses data a determined number of times or more, a case of accessing data unrelated to a function executed by a user, a case of having an access authority for data unrelated to a function of an application, and a case in which data access occurs by an application that has not been executed for a predetermined period of time or longer. According to another embodiment, the electronic device 200 may map information on whether the access event has an abnormal behavior with event information of the corresponding event so as to store the mapped information in the memory 250, and may distinctively store a normal access event and an abnormal behavior access event in the memory 250.

According to various embodiments, when the access event occurs, the electronic device 200 may provide notifications in various ways so as to enable the user to immediately identify the occurrence of the access event and take action for the same. For example, the occurrence of the data access event is notified via the edge light 510, the vibration 520, the notification sound 530, and the like of the electronic device 200. In addition, an abnormal behavior access event may be notified differently from a normal access event.

According to various embodiments, when event information is stored, the electronic device 200 may encrypt the information. An encryption scheme may include at least one of DES, Triple-DES, and AES. Later, when the user inquiries about the encrypted information, the inquiry may be made via authentication by using a scheme selected by the user. For example, the inquiry is made after performing decryption by selecting at least one authentication scheme among fingerprint recognition, iris recognition, FaceID, a password, a pattern, and a gesture.

According to various embodiments, in operation 904, when the access event of the application occurs, the electronic device 200 may acquire an application execution screen in response to detection of the access event, in order to store information related to the access event as visualized information. For example, when the access event occurs, the electronic device 200 captures an image of the execution screen of the application, which is input to the display 220. Alternatively, the electronic device 200 may store image information drawn on the surface by the application. The electronic device 200 may store the application execution screen in the form of a thumbnail and map the same with the event information indicating the access event, so as to store the mapped thumbnail with information in the memory 250.

According to various embodiments, when the access event continuously occurs, the electronic device 200 may store the video 730 of the execution screen during execution of the application. To this end, the electronic device 200 may determine whether the access event by the application continuously occurs.

According to various embodiments, in operation 906, the electronic device 200 may map and store the acquired application execution screen with the event information indicating the access event. The event information may include the application accessing a resource, and at least some of the accessed resource, an access time, read information, and the presence or absence of an abnormal behavior for the access event generated by the application. According to another embodiment, when the access event occurs, the electronic device 200 may map the event information with sound information including at least some of voice information acquired via the microphone and a sound signal generated by the application, so as to store the mapped information.

According to various embodiments, in operation 908, the electronic device 200 may display, on the display 220, the first screen 600 and the second screen 700 which are related to access events occurred in various applications.

According to various embodiments, the first screen 600 may include at least one piece of event information, an execution screen of the application, which is mapped with the event information, and the event list 620 which may be configured according to an occurrence time of the access event. For example, the electronic device 200 displays, in units of respective access events, at least one of an icon 622*a* indicating at least one of the application, access event information 622*b*, or an execution screen 622*c* of the application, which is captured when an access event occurs. According to an embodiment, information related to the access event may further include an icon indicating sound information.

According to various embodiments, the electronic device 200 may determine an arrangement criterion for the event list 620 of the first screen 600, based on a user input. For example, according to a selection of the user, access events are listed in the order of occurrence time, arranged for each application, or arranged for each accessed resource.

According to various embodiments, the electronic device 200 may configure the first screen 600 in the order of occurrence time of each access event. The electronic device 200 may further display at least one of an icon indicating an application and event information.

According to various embodiments, the electronic device 200 may classify and list each event information for each application, and while classifying the event information for each application, may classify and list the event information in the order of occurrence time of each access event of the application. For example, if a first access event 622, a second access event 624, and a third access event 626 occur sequentially, the electronic device 200 records information on the respective access events sequentially in the memory 250. The electronic device 200 may arrange the first screen 600 vertically (or horizontally) in the order of the first access event 622, the second access event 624, and the third access event 626.

According to various embodiments, when configuring the first screen 600, the electronic device 200 may display some of the event information together with an icon indicating an application and an execution screen, according to a selection of the user. For example, information on at least one of an access event occurrence time, an accessed resource, an access frequency, and the presence or absence of an abnormal behavior is displayed according to a selection of the user. The user may configure, via the setting menu 800, a type of event information to be displayed on the first screen 600.

According to various embodiments, the electronic device 200 may classify and list each event information for each resource accessed via an access event. For example, if the fourth access event 632 for location information by the messenger application and the map application, the fifth access event 634 for body data information by the map application and the health application, and the sixth access event 636 for camera information by the messenger application, the navigation application, and the cloud application occur, the electronic device 200 classifies and store information on the respective access events in the memory 250. While classifying the fourth access event 632, the fifth access event 634, and the sixth access event 636 for each accessed resource and listing the same vertically (or horizontally) in the first screen 600, the electronic device 200 may display at least one of icons 632*a* indicating resources and icons 632*b* indicating applications accessing corresponding resources.

According to various embodiments, when configuring the first screen 600 by classification for each accessed resource, the electronic device 200 may list icons indicating an application in chronological order of accessing respective resources. For example, if the sixth access event occurs in the order of the messenger application, the navigation application, and the cloud application, the electronic device 200, while listing access events for camera information, sequentially arranges the messenger application, the navigation application, and the cloud application horizontally (or vertically).

According to various embodiments, when listing resources, the electronic device 200 may list the same vertically (or horizontally) in the order of the number of occurrences of the access events. For example, if an access event for the location data occurs the most, and the number of occurrences is decreased in the order of the body data and the camera, the electronic device 200 configures the second screen 700 by sequentially arranging the fourth access event 632, the fifth access event 634, and the sixth access event 636.

According to various embodiments, the electronic device 200 may display at least one of a time at which a corresponding application accesses a resource and the number of times of accessing the resource, on one side of an icon indicating the application. If an access event is continuously performed, a time at which the access event has occurred and a time at which the access event has ended may be displayed together.

According to various embodiments, the electronic device 200 may display only an application currently accessing a resource. According to various embodiments, the electronic device 200 may display only an access event that occurred within a predetermined time according to a user's setting. For example, if a user has configured to view an access event that occurred 10 minutes ago for the map application, an access event that occurred 3 minutes ago for the messenger application, and an access event that occurred during the last 5 minutes for the cloud application currently accessing a resource, only the messenger application and the cloud application is displayed on the first screen 600.

According to various embodiments, the first screen 600 may further include the first timestamp bar 610 indicating an application having accessed data for each time slot. For example, the first timestamp bar 610 displays, in chronological order, the application icon 614 or the icon indicating a resource for each access event. The first timestamp bar 610 may summarize and indicate access events for a predetermined period according to a user's setting. For example, if a user configures the predetermined period to be one day, the first timestamp bar 610 indicates a summary of access events having occurred during one day and is reset on the next day. The first timestamp bar 610 may further include some of event information according to a user's setting.

According to various embodiments, the electronic device 200 may provide a visual effect indicative of an abnormal behavior in response to an access event estimated to be an abnormal behavior. For example, a separate indication is made by displaying, in bold, the border of a thumbnail of an application having caused an abnormal behavior, or by adding a graphic object (e.g., an exclamation mark) indicating the abnormal behavior to one side of the thumbnail.

According to various embodiments, the abnormal behavior estimated by the electronic device 200 may be separately indicated in the first timestamp bar 610. For example, a separate indication is made by adding a graphic object (e.g., an exclamation mark 611 indicating an abnormal behavior to one side of a picture of an application having caused the abnormal behavior.

According to various embodiments, the electronic device 200 may display the second screen 700, based on a user input on the first screen 600 displayed on the display 220. For example, if a user touches at least one of event information, an execution screen, or a thumbnail of an application while the first screen 600 is being displayed, the electronic device 200 displays the second screen 700 corresponding to the event information.

According to various embodiments, the second screen 700 may include an application execution screen and the authority control menu 720. The execution screen of the application may be at least one of the captured image 710 and the recorded video 730 when an access event occurs, and an icon indicating that a call is in progress. The electronic device 200 may control at least one of whether to revoke an authority of an application, whether to allow access only for an application running in the foreground, and whether to delete an application, according to a user input in the authority control menu 720.

According to various embodiments, the electronic device 200 may determine whether the access event has occurred continuously, and may configure the second screen 700 differently according to the determination. If the access event occurs discontinuously, the second screen 700 may include an application execution screen and the authority control menu 720. If an access event of the application occurs multiple times, when the screen is swiped horizontally, or arrow buttons on the left and right are touched, a subsequent or previous execution screen may be displayed. The numbering 714 indicating a number for a currently displayed execution screen may be displayed at the bottom of the execution screen. For example, if a total of 6 access events have occurred by a corresponding application and a user is viewing a second screen, the numbering 714 is displayed, at the bottom, in order from 1 to 6, and a separate indication may be applied to number 2 (e.g., circle, shade, and bold font).

According to various embodiments, if the access event occurs continuously, the electronic device 200 may store a video of an execution screen of an application in the memory 250 during the occurrence of the access event, and may display the execution screen, the video 730 of which has been stored, on the second screen 700. According to an embodiment, the electronic device 200 may generate the second screen 700 including the second timestamp bar 740 specifically indicating a resource, which a corresponding application has accessed, for each time slot. The second timestamp bar 740 may include a character or an icon indicating a resource accessed by an application, and may distinctively display the same by shade and color. For example, if an application accesses location information, the address book, and the camera in sequence, the electronic device 200 divides the second timestamp bar 740 by different shades or colors according to the location information, the address book, and a time at which the camera accesses a resource, and displays characters or icons indicating the location information, the address book, and the camera in each part.

According to various embodiments, the time mark 744 indicating a time at which an application accesses each resource may be displayed on one side of the second timestamp bar 740. When a user inquiries about a corresponding time slot of the second timestamp bar 740, the electronic device 200 may reproduce video or audio information recorded in the time slot.

According to various embodiments, the electronic device 200 may configure the setting menu 800 enabling to change configurations for stored data, notifications, and the like according to a user's selection. The setting menu 800 may include at least one of the notification setting menu 810 for configuration of a notification method and the event storage setting menu 820 for configuration of a stored record. The notification setting menu 810 may enable configuration of a notification only for an abnormal behavior event, a data capacity saving mode, a notification only for a specific app, a notification only for specific authority access, a notification only for an access event in a specific time slot, etc., and the event storage setting menu 820 may enable configuration of whether to encrypt an event storage space, an event storage duration, etc., as desired by a user.

According to various embodiments, respective items of the setting menus 800 may be placed together with the toggle switches 814 enabling selection of enabling/disabling of the items. A user may swipe or touch the toggle switch 814 so as to change a configuration of a corresponding item. For example, if a user desires to be notified of only an abnormal behavior access event and desires to disable encryption of the event storage space, configurations is changed by turning on the toggle switch 814 for "notification only for abnormal events" and turning off the toggle switch 814 for "event storage space encryption".

According to various embodiments, when a notification method item is touched, a notification method may be configured. For example, the notification method configured to be the edge light 510 is configured to be notification using the notification sound 530, and the notification sound 530 is configured separately when a normal access event occurs and an abnormal behavior access event occurs.

According to various embodiments, a user may configure event record storage via the event storage setting menu 820. For example, the event record storage is configured so that information of a normal access event is stored for a month and then automatically deleted thereafter, and an abnormal behavior access event is not deleted.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display;

memory storing instructions; and at least one processor operatively connected to the display and the memory, wherein the instructions, when executed by the at least one processor individually or collectively cause the electronic device to:

detect an access event for a resource of the electronic device, the access event being generated by an application, in response to detecting the access event while the application is in a background state, acquire an execution screen of the application, map the acquired execution screen of the application with event information indicating the access event so as to store the same, determine the access event as an abnormal behavior based on the access event corresponding to one of a plurality of cases, wherein the plurality of cases comprises a case in which the application in the background state accesses data a determined number of times or more, a case of accessing data unrelated to a function executed by a user, a case of having an access authority for data unrelated to a function of the application, and a case in which data access occurs by the application that has not been executed for a predetermined period of time or longer, based on determining the access event as the abnormal behavior, provide a visual effect indicating the abnormal behavior in relation to the event information, and based on a user input for the execution screen of the application or the event information displayed on a first screen, display, on the display, a second screen comprising the acquired execution screen and an authority control menu enabling configuration of an access authority of the application with respect to the resource, and wherein, the instructions, when executed by the at least one processor individually or collectively, further cause the electronic device to:

based on the access event occurring continuously, display, on the display, the second screen further comprising a timestamp bar listing resources accessed by the application in chronological order.

2. The electronic device of claim 1, wherein the instructions, when executed by the at least one processor individually or collectively, further cause the electronic device to display, on the display, a first screen comprising one or more among at least one piece of the event information, at least one application execution screen mapped to the event information, and a timestamp bar visualizing access events in chronological order.

3. The electronic device of claim 2, wherein, in the first screen, the at least one piece of the event information is listed in chronological order.

4. The electronic device of claim 2, wherein, in the first screen, the at least one piece of the event information is classified and listed for each application.

5. The electronic device of claim 2, wherein, in the first screen, the at least one piece of the event information is classified and listed for each resource accessed via the access event.

6. The electronic device of claim 1, wherein the execution screen of the application comprises at least one among an image captured when the access event occurs, an icon indicating that a call is in progress, and voice information received by a microphone and a video recorded during the occurrence of the access event.

7. A method for visualizing an access event by an electronic device, the method comprising:

detecting the access event for a resource of an electronic device, the access event being generated by an application;

in response to detection of the access event while the application is in a background state, acquiring an execution screen of the application in response to detection of the access event; and mapping the acquired execution screen of the application with event information indicating the access event so as to store the same;

determining the access event as an abnormal behavior based on the access event corresponding to one of a plurality of cases, wherein the plurality of cases comprises a case in which the application in the background state accesses data a determined number of times or more, a case of accessing data unrelated to a function executed by a user, a case of having an access authority for data unrelated to a function of the application, and a case in which data access occurs by the application that has not been executed for a predetermined period of time or longer;

based on determining the access event as the abnormal behavior, providing a visual effect indicating the abnormal behavior in relation to the event information; and based on a user input for the execution screen of the application or the event information displayed on a first screen, displaying, on a display, a second screen comprising the acquired execution screen and an authority control menu enabling configuration of an access authority of the application with respect to the resource, wherein displaying the second screen comprises:

based on the access event occurring continuously, displaying, on the display, the second screen further comprising a timestamp bar listing resources accessed by the application in chronological order.

8. The method of claim 7, further comprising displaying, on the display, a first screen comprising one or more among at least one piece of the event information, at least one application execution screen mapped to the event information, and a timestamp bar visualizing access events in chronological order.

9. The method of claim 8, wherein the displaying of the first screen on the display comprises listing the at least one piece of the event information in chronological order.

10. The method of claim 8, wherein the displaying of the first screen on the display comprises classifying and listing the at least one piece of the event information for each application.

11. The method of claim 8, wherein the displaying of the first screen on the display comprises classifying and listing the at least one piece of the event information for each resource accessed via the access event.

12. One or more non-transitory computer-readable storage media storing one or more computer programs including computer-executable instructions that, when executed by one or more processors of an electronic device individually or collectively, cause the electronic device to perform operations, the operations comprising:

detecting an access event for a resource of an electronic device, the access event being generated by an application;

in response to detection of the access event while the application is in a background state, acquiring an execution screen of the application in response to detection of the access event; and mapping the acquired execution screen of the application with event information indicating the access event so as to store the same;

determining the access event as an abnormal behavior based on the access event corresponding to one of a plurality of cases, wherein the plurality of cases comprises a case in which the application in the background state accesses data a determined number of times or more, a case of accessing data unrelated to a function executed by a user, a case of having an access authority for data unrelated to a function of the application, and a case in which data access occurs by the application that has not been executed for a predetermined period of time or longer;

based on determining the access event as the abnormal behavior, providing a visual effect indicating the abnormal behavior in relation to the event information; and based on a user input for the execution screen of the application or the event information displayed on a first screen, displaying, on the display, a second screen comprising the acquired execution screen and an authority control menu enabling configuration of an access authority of the application with respect to the resource, wherein displaying the second screen comprises:

based on the access event occurring continuously, displaying, on the display, the second screen further comprising a timestamp bar listing resources accessed by the application in chronological order.

13. The one or more non-transitory computer-readable storage media of claim 12, the operations further comprising:

displaying, on the display, a first screen comprising one or more among at least one piece of the event information, at least one application execution screen mapped to the event information, and a first timestamp bar visualizing access events in chronological order.

* * * * *